United States Patent
Kushner et al.

[11] 3,971,500
[45] July 27, 1976

[54] METHOD OF METALLURGICALLY JOINING TUBING TO A WALL SEGMENT

[75] Inventors: Gerald J. Kushner; John H. Nininger, III, both of Louisville, Ky.

[73] Assignee: General Electric Company, Louisville, Ky.

[22] Filed: July 16, 1975

[21] Appl. No.: 596,317

[52] U.S. Cl. .............................. 228/154; 29/157 T; 29/157.4; 228/254; 228/141
[51] Int. Cl.² ..................... B23K 1/04; B23K 1/12
[58] Field of Search .......... 228/153, 154, 173, 141, 228/254; 29/157.4, 157 T, 157.5; 219/85 A, 85 D, 85 M

[56] References Cited
UNITED STATES PATENTS

| | | | |
|---|---|---|---|
| 2,318,707 | 5/1943 | Nichols et al. | 29/157 T |
| 2,530,855 | 11/1950 | Bugg et al. | 29/157.4 |
| 3,633,266 | 1/1972 | Taylor | 228/254 X |
| 3,714,389 | 1/1973 | Torii | 228/173 X |

FOREIGN PATENTS OR APPLICATIONS

| | | | |
|---|---|---|---|
| 1,204,724 | 9/1970 | United Kingdom | 219/85 M |

*Primary Examiner*—Al Lawrence Smith
*Assistant Examiner*—K. J. Ramsey
*Attorney, Agent, or Firm*—Frank P. Giacalone; Francis H. Boos

[57] ABSTRACT

The method of joining tube members including a cicumferentially arranged lip means to a wall segment having an aperture wherein the lip means and said wall segment are coated with a layer of solder and a heated forming means is applied to the lip and wall segment to reflow the solder while simultaneously applying sufficient pressure to deform the lip and wall segment to cause an oxide layer on the solder to disperse in a desultory manner so that the solder layers combine to form a joint.

9 Claims, 4 Drawing Figures

METHOD OF METALLURGICALLY JOINING TUBING TO A WALL SEGMENT

BACKGROUND OF THE INVENTION

1. Field of the Invention

This invention relates generally to a method of joining metal tube members including circumferentially disposed lip means to a wall segment having an aperture and more specifically to coating the surfaces to be joined with a layer of solder and then simultaneously heating the surfaces to reflow the solder and applying pressue with a heated forming means for a time sufficient to disperse an oxide layer from the surface of the solder to allow the coating on the surfaces to combine and form a joint. In effect a fluxless joining of the coated surfaces is accomplished with the use of a heated forming means which is capable of simultaneously reflowing the solder while deforming the surfaces to disperse oxide from the surface of the solder.

2. Description of the Prior Art

In joining aluminum surfaces or surfaces that are provided with a layer of solder, it is customary to remove the oxide coating from the surfaces to be joined so as to allow the joining alloy to wet the surface to be joined to provide a metallurgical joint. A common way of removing oxide from the surfaces to be joined is to employ a flux before or during the joining operation, however, fluxless joining has been found to be more advantageous.

Fluxless techniques are presently available which eliminate the oxide problem wherein the members to be joined are moved relative to each other at soldering temperatures to break up the oxide film and permit wetting by the solder. U.S. Pat. No. 3,633,266—Taylor discloses one such method of joining aluminum tube members by fluxless soldering. In the method disclosed in the Taylor patent at least one of the members to be joined is coated with solder. The members are dimensioned to provide an interference fit when telescoped so that when the members are heated to reflow the solder engagement of the surfaces breaks up or disturbs the surface of the coating and the oxide film thereon to assure a bond between the tubes. While the above method may be effective in removing the oxide film and provide a satisfactory joint, the means employed to impart motion may of necessity be special high cost equipment. Further, to insure that when the members are moved relative to each other, the coating remains in contact, and rubs together to break up the surface oxide of the members, it is required that the members to be joined be fabricated within critical dimensions.

Another attempt at fluxless joining of aluminum surfaces is disclosed in U.S. Pat. No. 3,680,200—Terrill et al wherein tube ends are telescoped and a solder filler insert is positioned adjacent the area to be joined. The joint is heated and a multi-directional positive ultrasonic energy is applied to the joint site causing the molten joining alloy to cavitate thereby disturbing the oxide film and allow the joining alloy to wet the surfaces to be joined. As pointed out in the Terrill patent, it is critical that the annular gap between male and female members ranges from 0.002 inches to 0.006 inches around substantially the entire periphery. Maintaining these critical gaps could add extra burdens in their manufacture.

Another technique employed in fluxless soldering is the ultrasonic dip soldering in which ultrasonic energy is used to disturb the oxide film. U.S. Pat. No. 3,831,263—Dzierski discloses a dip or immersion soldering technique using an ultrasonically energized bath. The above technique requires that the total joint area be immersed in the solder bath which in some instances is difficult or impossible in a complex heat exchanger. It should be noted that relative to the present invention the ultrasonic dip soldering may be employed as the coating operation.

Canadian Patent 671,383—Bouton discloses a method of tinning a body of aluminum wherein the aluminum is heated and the solid solder is drawn across the surface to melt the solder and wet the aluminum surface, while floating the oxide layer to the top of the molten body and stirring the solder so as to disperse the oxide layer.

Another attempt at joining aluminum surfaces is disclosed in U.S. Pat. No. 3,180,022—Briggs wherein at least one of the surfaces to be joined is coated with a bonding metal. The surfaces to be joined are brought into intimate contact and then heated at a temperature between the eutectic formation temperature and the melting point of the aluminum members, until the members are joined by diffusion of the formed eutectic away from the interface into the members.

SUMMARY OF THE INVENTION

By the present invention a method of metallurgically joining a tube member including a circumferentially disposed lip means to a wall segment having an aperture. The lip means and wall segment are coated with a layer of solder and the tube member is arranged on the wall segment so that the tube is in communication with the aperture and the lip means is in contact with the wall segment adjacent the aperture. A heated forming means having a temperature sufficient to reflow the solder is applied to the assembled lip means and wall segment. The heating means is effective in simultaneously melting the solder and applying pressure to the joint area while the solder is in liquid form, and continuing to apply sufficient pressure to deform the lip means and wall segment to cause an oxide layer on the solder to disperse so that the solder combines to form a joint between the tube and wall segment.

DESCRIPTION OF THE PREFERRED EMBODIMENT

By the present invention a method is provided for joining a tube member to a wall segment and more specifically in making joints that may be adapted for use in the manufacture of heat exchangers employed in refrigeration systems. In carrying out the following method of the present invention aluminum members were joined together, however, it should be noted that the present method may be employed successfully with other metals used in refrigeration systems such as copper, steel or any combination thereof.

The surfaces to be joined are pretinned or coated with a layer of solder. The solder coating may be applied in any one of the various known manners, however, an ultrasonic bath wherein molten solder is subjected to ultrasonic waves during the coating process has been used to effectively coat the surfaces to be joined with a layer of solder without the use of a flux.

Satisfactory joints have been realized when the thickness of the solder coating was between 0.001 and 0.005 inches, and when its composition was normally 92–98% Zn and 2–8% Al. While satisfactory joints have been made with a coating of solder having a thickness and composition within the above parameters it should be understood that solders having other compositions and thickness may be effectively employed and the exact solder composition and its relative thickness do not form a part of this invention.

As mentioned hereinbefore, an object of the present invention is to provide a method of joining surfaces that have been first coated with a layer of solder that does not require a step of removing the oxide layer from the solder coating. Further, the present method of joining surfaces may be carried out manually or automatically and at an effective speed that will conveniently permit its use in conjunction with an automated relatively high speed assembly operation. Accordingly, heating and forming means 10 is provided for simultaneously heating the surfaces to be joined at a temperature sufficient to reflow the solder coating while at the same time applying sufficient pressure to deform the members and cause relative movement between the surfaces which break up the oxide layer formed on the solder thereby allowing the solder coatings to merge and form an effective joint between the members.

Figure 1:
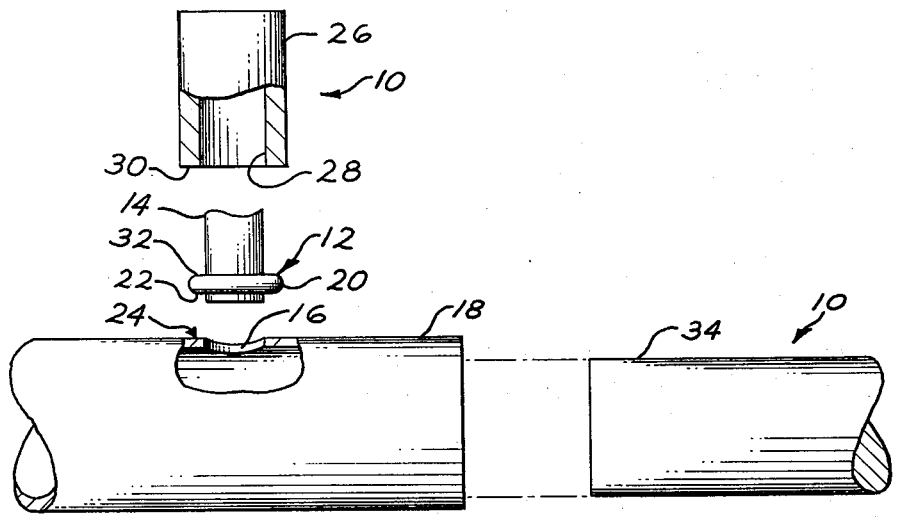
FIG. 1 is an exploded schematic view showing the members necessary to carry out the present method.

Referring to FIG. 1 of the drawings and specifically to the embodiment shown therein, an end portion 12 of a tube member 14 is dimensioned to be received in an aperture 16 of a member or conduit 18. The end portion 12 includes a bead or lip 20 arranged circumferentially and projecting radially outwardly beyond the peripheral edge of aperture 16, so that its bottom wall as viewed in FIG. 1, or joining surface 22, engages a wall segment 24 adjacent the periphery of the aperture 16 when the end portion 12 is positioned on the conduit 18. While the wall segment 24 is shown as part of a conduit it should be noted that the member 18 may be of any configuration including a flat wall.

Figures 2, 3:
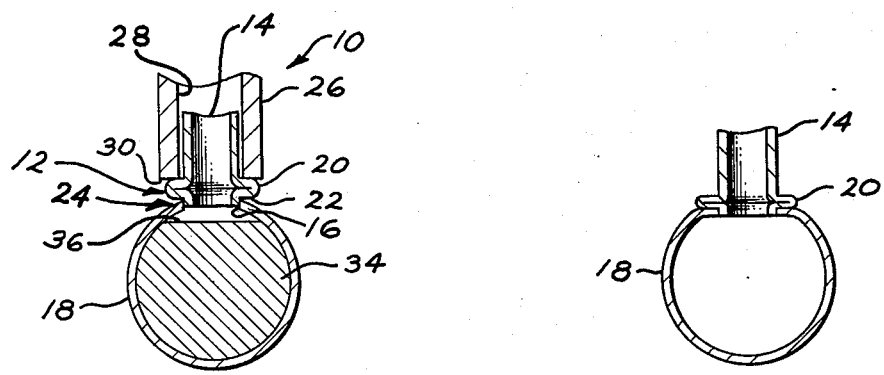
FIG. 2 is a sectional elevational view showing the members associated in an intermediate step of the method.
FIG. 3 is a sectional view showing the completed joint of the present method.

In accordance with the method of the present invention the joining surface 22 of lip means 20 and the wall segment 24 of conduit 18 to be joined are coated with a layer of solder in a manner hereinbefore described. With the surfaces 22 and 24 to be joined appropriately coated with a layer of solder, the next step in the method is to place the coated surfaces 22 and 24 including the layer of solder in contiguous relationship as shown in FIG. 2. To facilitate the assembly of the tube member 14 to the conduit 18 and to assure the tube 14 alignment with aperture 16, the bead 20 is spaced from the end of tube 14 so that a section somewhat less than the thickness of the conduit wall is arranged in the aperture.

The above method of joining the members 14 and 18 may be effected by several different mechanisms or heating and forming means. One heated forming means 10 referred to above, is shown schematically in FIGS. 1 and 2 and is applied to the members 14 and 18 in a manner which will be explained in detail. Accordingly the forming means 10 employed in carrying out the present method includes a sleeve or driven member 26 and base portion or mandrel 34. The sleeve 26 includes a bore 28 which is dimensioned to fit over the tube 14 with its lower end 30 as viewed in FIGS. 1 and 2 engaging the upper surface 32 of the lip 20. It should be noted that in the event tube 14 is part of a substantially long refrigerant tube system which would make the use of a closed sleeve 26 impractical, the sleeve 26 may then be constructed of two pieces which could be conveniently arranged about the tube end 12. With sleeve 26 arranged on the tube member 14 as shown in FIG. 2, the mandrel or base portion 34 of the forming means 10 is arranged in the conduit 18 so as to be positioned opposite the aperture 16 and wall segment 24.

In the next step of the method, sufficient heat is supplied by the forming means 10 to the end portion 12 of member 14, to wall segment 24 of conduit 18 to reflow the solder on surfaces 22 and 24. Either the driven member 26 or base portion 34 or both may be heated by an external heat source or, alternatively, by an internally built in heating source. One external method of heating the forming means 10 is to expose it to a heat source that automatically shuts off when a predetermined temperature is reached. Another method of heating may be to use an internal built in heating means or electrical resistor that is thermostatically controlled to maintain its temperature at a predetermined level.

It should be noted, however, that while the exact means employed to heat the forming means 10 is not critical it is, however, necessary that the temperature of the heated forming means 10 be sufficient to reflow the solder when applied to the assembly as shown in FIG. 2. This requirement necessitates that the forming means 10 be capable of raising, and maintaining the temperature of the members 14 and 18 in the joint area 22, 24 above the melting point of the solder and below that of the members. In carrying out the present method a temperature of between 800° F and 950° F was found effective.

With the solder in a liquid state the heated forming means 10 and more particularly the sleeve 26 is activated to apply pressure to the joined members. In effect the surface 30 of sleeve 26 forces the joining surface 22 of the bead 20 into engagement with the wall segment 24 with enough pressure to close the clearance between them and reduce the thickness of solder between the surface 22 and 24 to substantially zero or to a minimum thickness. When the joint is to be effected between a straight bead 20 and its joining surface 22 and a curved wall segment 24 forming a part of a curved wall conduit as shown, it is necessary that the mandrel 34 be provided with a flat portion 36 (FIG. 2) so that the conduit wall segment 24 is deformed to provide a corresponding flat portion in the joint area. While the end 30 of sleeve 26 is shown having a relatively flat face it should be understood that lip 20 may be shaped to conform with the outer curved wall of member 18 in which case end portion 30 would be formed to match, and the flat portion 36 would not be required.

To complete the joint the pressure applied to the sleeve 26 is continued past the mating of the parts so that wall segment 24 and joining surface 22 deform and elongate from their normal dimensions. During this wall deformation, movement occurs between the wall surfaces 22 and 24 to be joined relative to their solder thereby causing an oxide layer on the solder to break up.

In effect, the deformation of the joining surface 22 of bead 20 and wall segment 24 of conduit 18 by the heated forming means 10 causes a distortion or movement of the surfaces to be joined relative to the solder. This relative movement or elongation of the members and more specifically the surfaces to be joined as shown schematically in FIG. 3 while the solder is in a liquid state is effective in breaking up the oxide layer on the solder and to cause it to disperse in a random or desultory manner thereby allowing the merging of the solder layers on the surfaces 22 and 24 to form a metallurgical joint.

Figure 4:
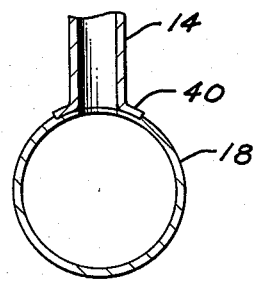
FIG. 4 is a sectional view showing a second embodiment of the method.

In another embodiment of the invention as shown in FIG. 4, a flange or lip 40 is formed on the end of tube 14 to form a saddle that conforms substantially to the circumferential outer wall of the conduit 18. In this embodiment the end 30 of sleeve 26 would conform to the shape of the flange 40 and conduit. It should be understood that a variety of wall configurations may be joined together by the present method.

In summary, the heating and deforming operation is of relatively short duration and in fact joints made in accordance with the present method have been accomplished in 2 to 6 seconds with the pressure applied by the heating and forming means to the aluminum tube members being between 250 and 500 lbs. p.s.i. While FIGS. 3 and 4 of the drawings show the wall section of the joined portions deformed it should be understood that the dimensioned distortion is schematically illustrated and as a result may be exaggerated to clearly show the dimensional differences of the members in the completed joints.

The foregoing is a description of the preferred embodiment of the invention and variations may be made thereto without departing from the true spirit of the invention, as defined in the appended claims.

What is claimed is:

1. The method of joining the end portion of a tube to a wall segment having an aperture for receiving said end portion comprising:
    forming a circumferentially disposed radially projecting lip means on said end portion including a joining surface;
    coating said joining surface and said wall segment adjacent the aperture;
    placing said end portion so that said tube is in communication with said aperture and the joining surface is in contact with said wall segment adjacent said aperture;
    placing a forming means on said tube into engagement with said lip means and said wall segment, said forming means being heated to a temperature sufficient to reflow said solder on said joining surface and said wall segment; and simultaneously
    applying pressure with said heated forming means to said lip means and said wall segment while the solder is in liquid form, with the thickness of solder between said joining surface and wall segment being reduced to a minimum thickness, and continuing to apply sufficient pressure to deform said lip means and said wall segment and cause relative movement between them and said solder to induce an oxide layer on said solder to disperse in a desultory manner so that the minimum liquid solder film combines to form a joint between said joining surface and said wall segment.

2. The method according to claim 1 wherein said tube and conduit are aluminum.

3. The method according to claim 2 wherein said heat and pressure is applied to said tube joining surface and said conduit wall segment for a period of between 2 to 6 seconds.

4. The method according to claim 3 wherein said pressure applied by said forming means is at least 250 lbs. p.s.i.

5. The method of joining the end portion of a tube to a conduit member including a wall segment having an aperture for receiving said end portion comprising:
    forming a circumferentially disposed radially projecting lip means on said end portion including a joining surface;
    coating said joining surface of said lip means and wall segment adjacent the aperture;
    placing said end portion of said tube in said aperture so that the joining surface of said lip means is in contact with said wall segment adjacent said aperture;
    placing a forming means including a sleeve means on said tube into engagement with said lip means and a mandrel in said conduit in contact with said wall segment, said forming means being heated to a temperature sufficient to reflow said solder on said joining surface and said wall segment; and simultaneously
    applying pressure with said heated forming means to said lip means and said wall segment while the solder is in liquid form, with the thickness of solder between said joining surface and said wall segment being reduced to a minimum thickness, and continuing to apply sufficient pressure to deform said lip means and said wall segment and cause relative movement between them and said solder to induce an oxide layer on said solder to disperse in a desultory manner so that the minimum liquid solder film combines to form a joint between said joining surface and said wall segment.

6. The method according to claim 5 wherein said lip means is spaced from the end of said tube so that it is arranged in said aperture when said lip joining surface is in engagement with said wall segment.

7. The method according to claim 6 wherein said tube and conduit are aluminum.

8. The method according to claim 7 wherein said heat and pressure is applied to said tube joining surface and said conduit wall segment for a period of between 2 to 6 seconds.

9. The method according to claim 8 wherein said pressure applied by said forming means is at least 250 lbs. p.s.i.

* * * * *